(12) United States Patent
Wang et al.

(10) Patent No.: US 9,113,224 B2
(45) Date of Patent: Aug. 18, 2015

(54) LOW-NOISE BLOCK DOWN-CONVERTER AND SATELLITE TELEVISION SYSTEM

(71) Applicant: Wistron NeWeb Corporation, Hsinchu (TW)

(72) Inventors: Che-Ming Wang, Hsinchu (TW); Chih-Chang Ko, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 535 days.

(21) Appl. No.: 13/726,627

(22) Filed: Dec. 26, 2012

(65) Prior Publication Data

US 2014/0089991 A1    Mar. 27, 2014

(30) Foreign Application Priority Data

Sep. 26, 2012 (TW) .............................. 101135324 A (51) Int. Cl.
  *H04B 10/00*     (2013.01)
  *H04N 21/61*     (2011.01)
  *H04N 7/20*      (2006.01)
  *H04N 7/22*      (2006.01)
  *H04H 40/90*     (2008.01)

(52) U.S. Cl.
  CPC .......... *H04N 21/6143* (2013.01); *H04H 40/90* (2013.01); *H04N 7/20* (2013.01); *H04N 7/22* (2013.01)

(58) Field of Classification Search
  CPC . H04N 7/20; H04N 21/6143; H04N 21/4622; H04B 7/18523; H04H 40/90
  See application file for complete search history.

(56) References Cited

FOREIGN PATENT DOCUMENTS

| TW | 534542    | 5/2003 |
| TW | M261922   | 4/2005 |
| TW | 201218648 | 5/2012 |

*Primary Examiner* — Rong Le
(74) *Attorney, Agent, or Firm* — Winston Hsu; Scott Margo (57) ABSTRACT

An optical low-noise block down-converter for a satellite television system is disclosed. The optical low-noise block down-converter includes a first down-conversion module coupled to a satellite antenna of the satellite television system for converting a vertically polarized signal received by the satellite antenna into a first intermediate frequency signal, a second down-conversion module coupled to the satellite antenna for converting a horizontally polarized signal received by the satellite antenna into a second intermediate frequency signal, and a third down-conversion module having a first input terminal coupled between the satellite antenna and a first down-converter of the first down-conversion module and a second input terminal coupled between the satellite antenna and a second down-converter of the second down-conversion module for draining out part of the vertically polarized signal and the horizontally polarized signal to combine and convert into a legacy electrical signal.

20 Claims, 5 Drawing Sheets

LOW-NOISE BLOCK DOWN-CONVERTER AND SATELLITE TELEVISION SYSTEM

BACKGROUND OF THE INVENTION

1. Field of the Invention

The present invention relates to an optical low-noise block down-converter and satellite television system, and more particularly, to an optical low-noise block down-converter and satellite television system capable of draining out part of the radio satellite signals to convert into a legacy electrical signal for improving an installation efficiency for the satellite television system.

2. Description of the Prior Art

An optical Low-Noise Block Down-converter (hereinafter called optical-LNB) is an advanced component for a satellite television system. Optical communication has advantages such as a wide bandwidth, a low signal loss for long distance transmission, an immunity from electromagnetic interference, and can be equipped with a passive optical splitter for transmitting multiple optical signals to multiple users simultaneously, which may overcome a disadvantage of great signal loss due to long distance transmission for a traditional cable, e.g. RG-6 cable.

In general, a traditional optical-LNB includes an F-connector for receiving an input power and a FC-connector for outputting an optical signal. However, the traditional optical-LNB does not have an output port for the radio satellite signal, i.e. an electrical signal, to support a Legacy operating mode. Hence, for positioning and aligning an antenna dish with a satellite, staff of a satellite television system operator may utilize a multiple dwelling unit to convert the optical signal into an electrical signal and utilize a signal demodulator, e.g. a set-up box, to demodulate the electrical signal. As a result, the staff may determine whether an installation of the antenna dish succeeded according to the demodulated electrical signal. Besides, the antenna dish and the optical-LNB are usually installed on a roof or an exterior wall of a building where power sockets or power source may not be available. Thus, the staff may have to use power from an interior of the building for powering the multiple dwelling unit and the demodulator. Such environmental disadvantages may prolong a time for positioning and aligning the antenna dish with the satellite and increase difficulties in installation of the satellite television system.

Therefore, how to directly drain out the satellite signals to convert into the electrical signal to support the legacy operating mode without affecting the standard installation of the satellite television system for speeding up the installation has become a main topic of the industry.

SUMMARY OF THE INVENTION

It is therefore an object of the present invention to provide an optical low-noise block down-converter and satellite television system capable of draining out a satellite signal to convert into a legacy electrical signal for improving an installation efficiency for the satellite television system.

The present invention discloses an optical-LNB (Low-Noise Block down-converter) for a satellite television system, comprising a first down-conversion module coupled to a satellite antenna of the satellite television system for converting a vertically polarized signal received by the satellite antenna into a first IF (Intermediate Frequency) signal, a second down-conversion module coupled to the satellite antenna for converting a horizontally polarized signal received by the satellite antenna into a second IF signal, and a third down-conversion module comprising a first input terminal coupled between the satellite antenna and a first down-converter of the first down-conversion module and a second input terminal coupled between the satellite antenna and a second down-converter of the second down-conversion module for draining out part of the vertically polarized signal and the horizontally polarized signal to combine and convert into a legacy electrical signal.

The present invention further discloses a satellite television system, comprising a satellite antenna for receiving a vertically polarized signal and a horizontally polarized signal, an optical-LNB (Low-Noise Block down-converter) comprising a first down-conversion module coupled to the satellite antenna for converting the vertically polarized signal into a first IF (Intermediate Frequency) signal, a second down-conversion module coupled to the satellite antenna for converting the horizontally polarized signal into a second IF signal, and a third down-conversion module comprising a first input terminal coupled between the satellite antenna and a first down-converter of the first down-conversion module and a second input terminal coupled between the satellite antenna and a second down-converter of the second down-conversion module for draining out part of the vertically polarized signal and the horizontally polarized signal to combine and convert into a legacy electrical signal, and a demodulator coupled to the optical-LNB for reading the legacy electrical signal to control an operation of the optical-LNB.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
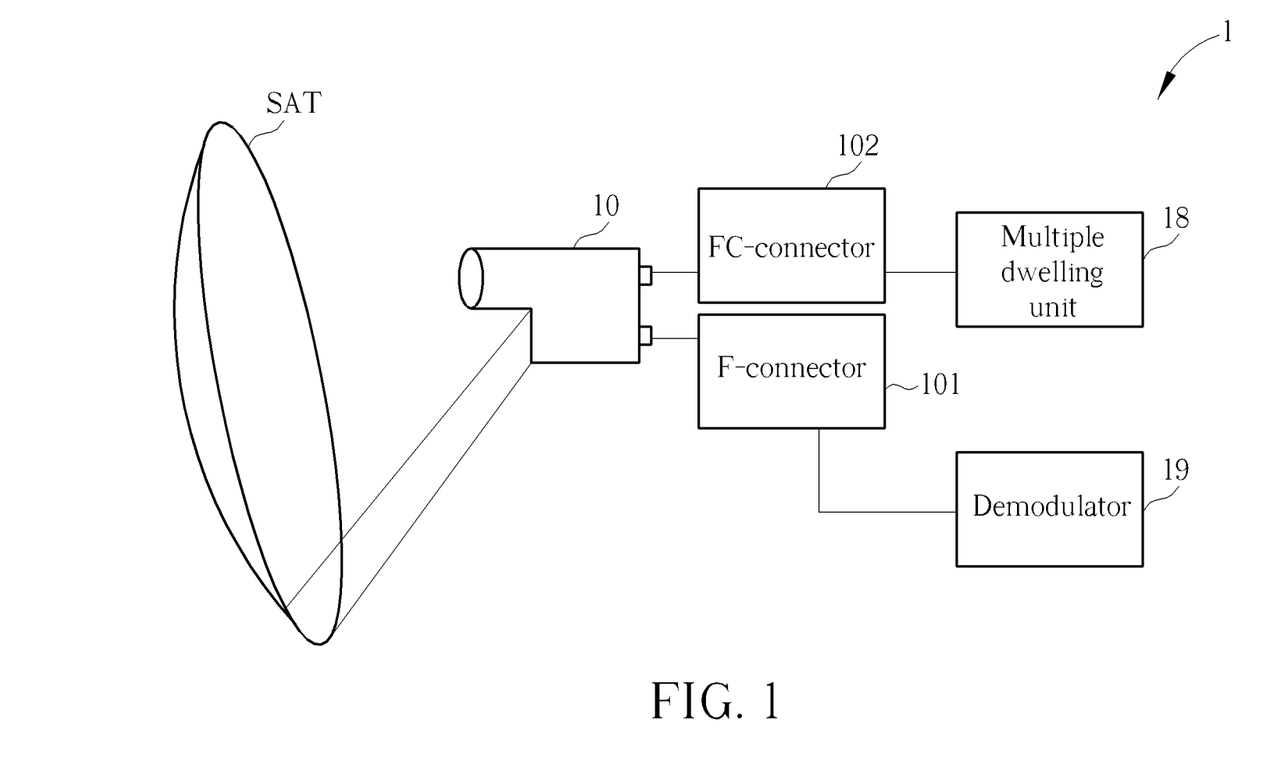
FIG. 1 is a schematic diagram of a satellite television system according to an embodiment of the present invention.
Figure 2:
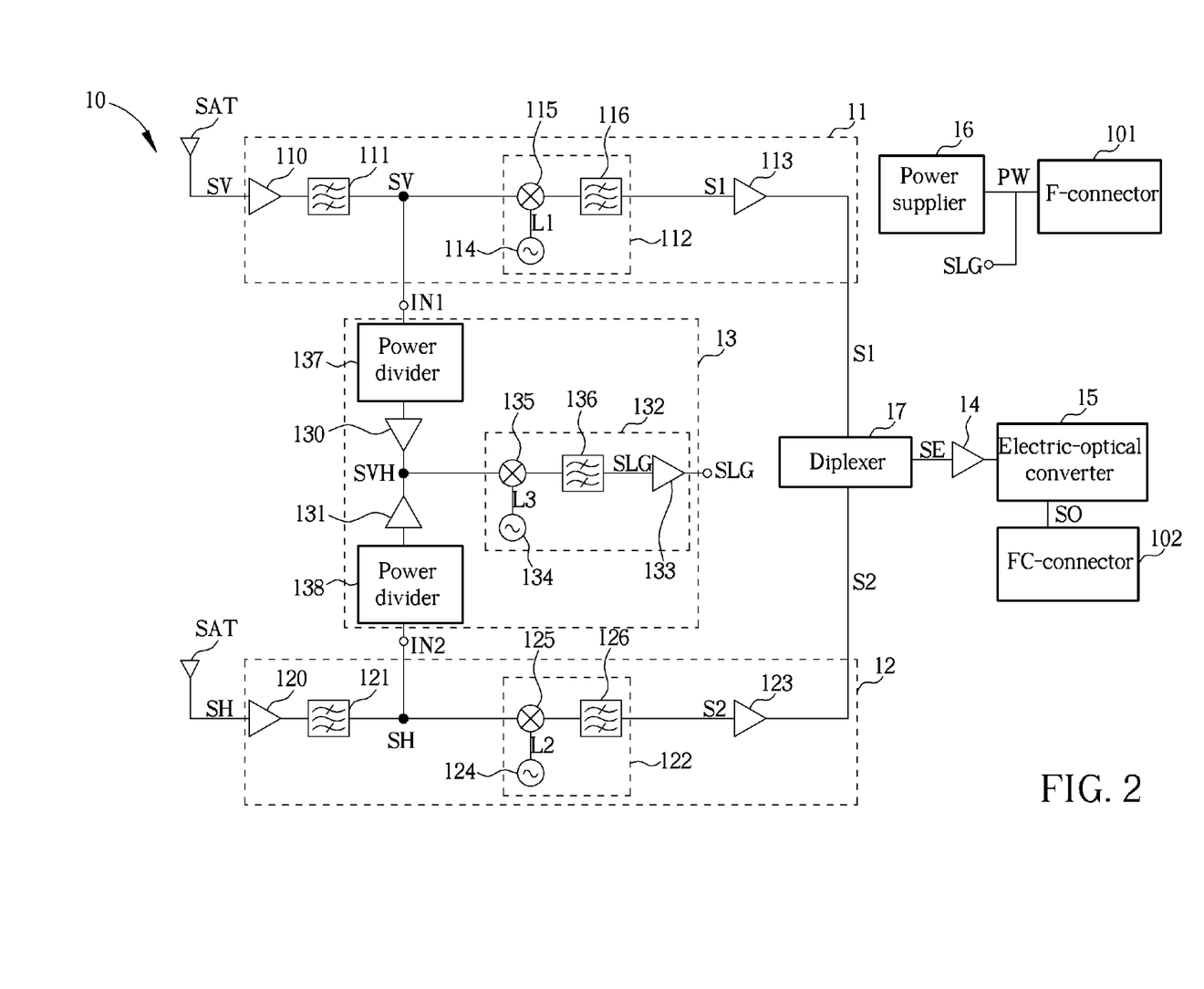
FIG. 2 is a schematic diagram of an optical-LNB according to an embodiment of the present invention.

Please refer to FIG. 1, which is a schematic diagram of a satellite television system 1 according to an embodiment of the present invention. The satellite television system 1 includes a satellite antenna SAT, an optical-LNB 10, a multiple dwelling unit 18 and a demodulator 19. The satellite antenna SAT is used for receiving satellite signals in high frequencies, the satellite signal may include a vertically polarized signal SV and a horizontally polarized signal SH. The optical-LNB 10 is coupled to the satellite antenna SAT for converting the vertically polarized signal SV and the horizontally polarized signal SH into an IF optical signal SO, and outputting the optical signal SO to an optical fiber cable by the FC-connector 102, so as to transmit the optical signal SO to the multiple dwelling unit 18. The optical-LNB 10 is further coupled to the demodulator 19 for converting the vertically polarized signal SV and the horizontally polarized signal SH into a legacy electrical signal SLG to support the Legacy operating mode (as shown in FIG. 2). The legacy electrical signal SLG may be outputted to the demodulator 19 by the F-connector 101, such that the demodulator 19 may read the legacy electrical signal SLG and demodulate information in the satellite signals. The demodulator 19 may be used for supplying a power PW to the optical-LNB 10 for powering the optical-LNB 10 as well.

Noticeably, the optical-LNB 10 of the present invention is a composite optical-LNB, which provides an output port for the traditional optical signal and an output port for the legacy electrical signal. The optical-LNB 10 may utilize one of its down-conversion modules to drain out part of the satellite signals to convert into the legacy electrical signal SLG. In such a structure, during the installation, the demodulator 19, e.g. a set-up box or a monitoring device, may be directly coupled to the F-connector 101 to read the legacy electrical signal SLG and determine the whether the installation succeeded instead of converting the optical signal SO back into an electrical signal and utilizing the set-up box to read the electrical signal, which may decrease the difficulty for installing the satellite television system. Meanwhile, the demodulator 19 may also output the power PW to power the optical-LNB 10, which saves a work for finding respective power sources for the optical-LNB 10 and the set-up box.

Please refer to FIG. 2, which is a schematic diagram illustrating a circuit structure of the optical-LNB 10 according to an embodiment of the present invention. The optical-LNB 10 may be used for a satellite television system, the optical-LNB 10 includes a first down-conversion module 11, a second down-conversion module 12, a third down-conversion module 13, a diplexer 17, a gain amplifier 14, a electric-optical converter 15, a power supplier 16, the FC-connector 102 and the F-connector 101. In FIG. 2, the first down-conversion module 11 and the second down-conversion module 12 are coupled to the satellite antenna SAT for respectively converting the vertically polarized signal SV and the horizontally polarized signal SH received by the satellite antenna SAT into a first IF (Intermediate Frequency) signal S1 and a second IF signal S2. The diplexer 17 is coupled to the first down-conversion module 11 and the second down-conversion module 12 for combining the first IF signal S1 with the second IF signal S2 into an electrical signal SE. The gain amplifier 14 is coupled to the diplexer 17 for amplifying the electrical signal SE. The electric-optical converter 15 is coupled between the gain amplifier 14 and the FC-connector 102 for converting the electrical signal SE into the optical signal SO. The power supplier 16 is coupled to the F-connector 101 for receiving the power PW to power elements comprised in the optical-LNB 10. The third down-conversion module 13 includes a first input terminal IN1 and a second input terminal IN2. The first input terminal IN1 is coupled to the first down-conversion module 11 for draining out part of the vertically polarized signal SV. The second input terminal IN2 is coupled to the second down-conversion module 12 for draining out part of the horizontally polarized signal SH. The third down-conversion module 13 may add the vertically polarized signal SV with the horizontally polarized signal SH to convert into a legacy electrical signal SLG, and output the legacy electrical signal SLG by the F-connector 101.

The first down-conversion module 11 includes an LNA (Low Noise Amplifier) 110, a bandpass filter 111, a down-converter 112 and a gain amplifier 113. The down-converter 112 includes an oscillator 114, a mixer 115 and a bandpass filter 116. The second down-conversion module 12 includes an LNA 120, a bandpass filter 121, a down-converter 122 and a gain amplifier 123. The down-converter 122 includes an oscillator 124, a mixer 125 and a bandpass filter 126.

Taking the first down-conversion module 11 for example, the LNA 110 is used for receiving and amplifying the vertically polarized signal SV. The bandpass filter 111 is coupled to the LNA 110 for filtering the vertically polarized signal SV in a high frequency band, i.e. 10.7-12.75 GHz. The down-converter 112 is coupled between the bandpass filter 111 and the gain amplifier 113 for converting the vertically polarized signal SV in the high frequency band into a first IF signal S1 to output to the gain amplifier 113. The gain amplifier 113 is used for amplifying the first IF signal S1. In the down-converter 112, the oscillator 114 is used for generating a first local oscillating signal L1, e.g. 9.75 GHz. The mixer 115 is coupled to the oscillator 114 and the bandpass filter 111 for mixing the vertically polarized signal SV with the first local oscillating signal L1. The bandpass filter 116 is coupled to the mixer 115 for filtering out a mirror signal after the vertically polarized signal SV is mixed with the first local oscillating signal L1 to obtain the required and down converted first IF signal S1. The second down-conversion module 12 is used for mixing the horizontally polarized signal SH with a second local oscillating signal L2 to down convert into the second IF signal S2, a circuit structure and an operation of the second down-conversion module 12 are similar to those of the first down-conversion module 11, which is omitted for simplicity.

The third down-conversion module 13 includes LNAs 130 and 131, power dividers 137 and 138 and a down-converter 132. The power divider 137 is coupled to the first input terminal IN1 for draining out part of the vertically polarized signal SV. The LNA 130 is coupled to the power divider 137 for receiving and amplifying the vertically polarized signal SV. The power divider 138 is coupled to the second input terminal IN2 for draining out part of the horizontally polarized signal SH. The LNA 131 is coupled to the power divider 138 for receiving and amplifying the horizontally polarized signal SH. The LNAs 130 and 131 are coupled to each other such that the vertically polarized signal SV and the horizontally polarized signal SH are added together to generate a composite signal SVH. The down-converter 132 is coupled to the LNAs 130 and 131 for converting the composite signal SVH into the legacy electrical signal SLG.

The down-converter 132 includes an oscillator 134, a mixer 135, a bandpass filter 136 and a gain amplifier 133. The oscillator 134 is used for generating a third local oscillating signal L3, e.g. 9.75 GHz or 10.6 GHz. The mixer 135 is coupled to the oscillator 134 and the bandpass filter 136 for mixing the composite signal SVH with the third local oscillating signal L3. The bandpass filter 136 is coupled to the mixer 135 for filtering out a mirror signal after the composite signal SVH is mixed with the third local oscillating signal L3 to obtain the legacy electrical signal SLG. The gain amplifier 133 is coupled to the bandpass filter 136 for amplifying the legacy electrical signal SLG.

The following are down-conversion formulas for the first down-conversion module 11, the second down-conversion module 12 and the third down-conversion module 13 (Unit: GHz).

$$SV(10.7\text{-}12.75) - L1(9.75) = S1(0.95\text{-}1.95\text{-}3.0)$$

$$SH(10.7\text{-}12.75) - L2(7.30) = S2(3.40\text{-}4.4\text{-}5.45)$$

$$SVH(10.7\text{-}11.7) - L3(9.75) = S3(0.95\text{-}1.95)$$

$$SVH(11.7\text{-}12.75) - L3(10.6) = S3(1.1\text{-}2.15)$$

The first IF signal S1 may include a vertically polarized signal in a low frequency band (Vertical Low, VL) and a vertically polarized signal in a high frequency band (Vertical High, VH). The second IF signal S2 may include a horizontally polarized signal in a low frequency band (Horizontal Low, HL) and a horizontally polarized signal in a high frequency band (Horizontal High, HH). For the legacy operating mode, the legacy electrical signal SLG may be the VL, VH, HL or HH signal. The following table lists frequency ranges of the VL, VH, HL and HH signals and corresponded operating voltages. (Unit: GHz)

| Vertically/<br>Horizontally<br>Polarized Signal | Optical Signal | Legacy<br>Electrical<br>signal | Operating<br>Voltage<br>(Legacy) |
|---|---|---|---|
| VL | 0.95-1.95 | 0.95~1.95 | 13 Volts |
| VH | 1.95-3.0 | 1.1-2.15 | 13 Volts, 22 KHz |
| HL | 3.4-4.4 | 0.95-1.95 | 18 Volts |
| HH | 4.4-5.45 | 1.1-2.15 | 18 Volts, 22 KHz |

Since the operation of the optical-LNB 10 depends on its operating voltage, adjusting a direct voltage and an alternating voltage of the power PW may control the operation of the optical-LNB 10. Specifically, during the installation, the set-up box may directly input the power PW to the optical-LNB 10, such that the LNAs 130 and 131 of the third down-conversion module 13 may be turned on or off by adjusting the direct voltage and the alternating voltage of the power PW, so as to switch the vertically polarized signal SV or the horizontally polarized signal SH to enter the third down-conversion module 13. Meanwhile, the set-up box may read the legacy electrical signal SLG by the F-connector 101 so that the staff may determine whether the installation is succeeded accordingly. For example, when the set-up box inputs the power PW with 13 volts to the optical-LNB 10, the legacy electrical signal SLG outputted by the third down-conversion module 13 is the VL signal, i.e. 0.95-1.95 GHz. When the set-up box inputs the power PW with 18 volts to the optical-LNB 10, the legacy electrical signal SLG is the HL signal, i.e. 0.95-1.95 GHz. When the set-up box inputs the power PW with 18 volts and 22 KHz to the optical-LNB 10, the legacy electrical signal SLG is the HH signal, i.e. 1.1-2.15 GHz.

In short, the optical-LNB 10 of the present invention may utilize the third down-conversion module 13 to drain out part of the vertically and horizontally polarized signals to add together and convert into the legacy electrical signal SLG. Meanwhile, the F-connector 101 may output the legacy electrical signal SLG to the set-up box, and the set-up box may input the power PW to the optical-LNB 10, such that the set-up box may adjust the direct and alternating voltages of the power PW to control the operation of the third down-conversion module 13 and control which band and type of the legacy electrical signal SLG is outputted. As a result, during the installation, the staff may utilize the set-up box to read the legacy electrical signal for determining whether the installation succeeded and instantly monitoring a quality and stability of satellite signals, and there is only one power source for both of the optical-LNB 10 and the demodulator 19 for convenience.

Figure 3:
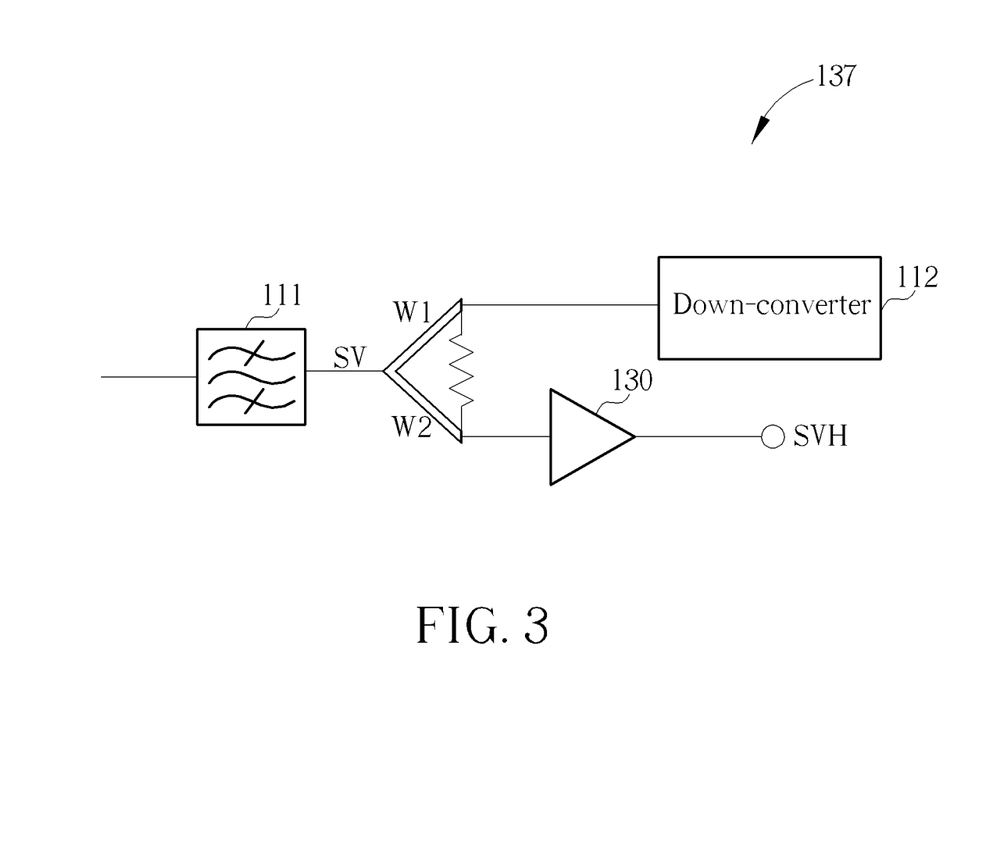
FIG. 3 is a schematic diagram of a power divider for the optical-LNB shown in FIG. 2.

Noticeably, the present invention is not limited to above embodiments, those skilled in the art may make modifications or alterations accordingly. For example, the power dividers 137 and 138 may have different designs. Please refer to FIG. 3, which is a schematic diagram of the power divider 137. The power divider 137 is coupled to a signal path of the vertically polarized signal SV and utilizes metal wires W1 and W2 and a parallel resistor between the metal wires W1 and W2 to divide the vertically polarized signal SV into two branches.

Figure 4:
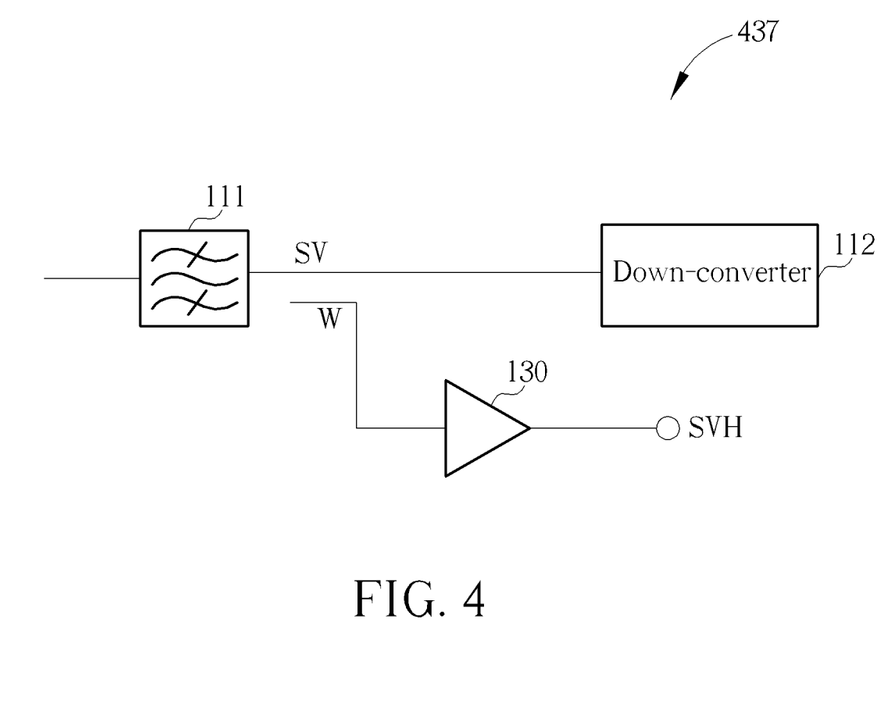
FIG. 4 is a schematic diagram of a coupling circuit for the optical-LNB shown in FIG. 2.

The power dividers 137 and 138 may be realized by a coupling circuit as well. Please refer to FIG. 4, which is a schematic diagram of a coupling circuit 437. The coupling circuit 437 may utilize a metal wire W disposed paralleled to the signal path of the vertically polarized signal SV, and the metal wire W is coupled to the LNA 130 to amplify the drained out vertically polarized signal SV.

Figure 5:
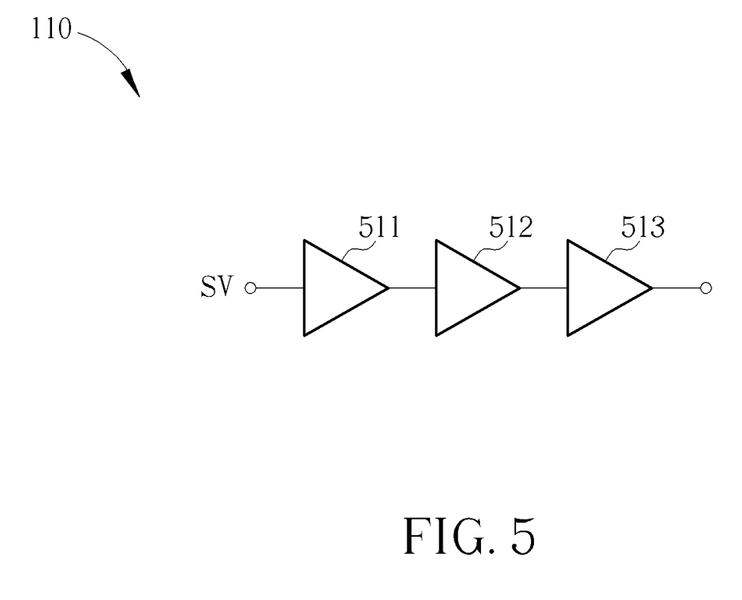
FIG. 5 is a schematic diagram of a low noise amplifier for the optical-LNB shown in FIG. 2.

The LNAs 110, 120, 130 and 131 may include at least one low noise amplification unit for providing different levels of signal amplification, a designer may adjust a number of the low noise amplification units according to practical requirements. For example, please refer to FIG. 5, which is a schematic diagram of the LNA 110. The LNA 110 includes low noise amplification units 511, 512 and 513 for respectively providing first, second and third level of signal amplification to its input signal.

On the other hand, since the third down-conversion module 13 may drain out part of the vertically polarized signal SV and the horizontally polarized signal SH, the first input terminal IN1 of the third down-conversion module 13 may be coupled to any terminals on a signal path between the satellite antenna SAT and the down-converter 112 of the first down-conversion module 11, and the second input terminal IN2 may be coupled to any terminals on a signal path between the satellite antenna SAT and the down-converter 122 of the second down-conversion module 12. For example, the first input terminal IN1 may be coupled between the satellite antenna SAT and the LNA 110, between the LNA 110 and the bandpass filter 111, or between the bandpass filter 111 and the mixer 115. The second input terminal IN2 may be coupled between the satellite antenna SAT and the LNA 120, between the LNA 120 and the bandpass filter 121, or between the bandpass filter 121 and the mixer 125.

To sum up, the optical-LNB of the present invention is a composite optical-LNB, which provides an output port for the traditional optical signal and another output port for the legacy electrical signal. The optical-LNB may utilize one of its down-conversion modules to drain out part of the front-end satellite signal and convert the satellite signal into the legacy electrical signal. In such a structure, the staff may directly couple the demodulator, e.g. a set-up box or a monitor device, to the F-connector 101 to read the legacy electrical signal, and determine whether the installation succeeded during the installation. Therefore, the staff no longer needs to convert the optical signal into the electrical signal and read the electrical signal by the set-up box, which simplifies the installation. In addition, the output port for the legacy electrical signal may be used for monitoring the quality and stability of satellite signals or other reception information, which may be an added value of the optical-LNB. On the other hand, since the demodulator or the set-up box may directly output power to the optical-LNB for controlling the operation of the optical LNB by adjusting the direct and alternating voltages, which also simplifies the power source for the installation. In the structure of the present invention, the installation for positioning and aligning the antenna dish with the satellite is the same as the traditional way but simplifies and speeds up the installation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical-LNB (Low-Noise Block down-converter) for a satellite television system, comprising:
   a first down-conversion module coupled to a satellite antenna of the satellite television system for converting a vertically polarized signal received by the satellite antenna into a first IF (Intermediate Frequency) signal;

a second down-conversion module coupled to the satellite antenna for converting a horizontally polarized signal received by the satellite antenna into a second IF signal; and a third down-conversion module comprising a first input terminal coupled between the satellite antenna and a first down-converter of the first down-conversion module and a second input terminal coupled between the satellite antenna and a second down-converter of the second down-conversion module for draining out part of the vertically polarized signal and the horizontally polarized signal to combine and convert into a legacy electrical signal.

2. The optical-LNB of claim 1, wherein the first down-conversion module comprises:
an LNA (Low Noise Amplifier) coupled to the satellite antenna, and comprising at least one low noise amplification unit for providing at least one level of signal amplification;
a bandpass filter coupled between the LNA and the first down-converter for filtering the vertically polarized signal to convert the vertically polarized signal into the first IF signal by the first down-converter; and
a gain amplifier coupled to the first down-converter for amplifying the first IF signal.

3. The optical-LNB of claim 2, wherein the first down-converter comprises:
an oscillator for generating a first local oscillating signal;
a mixer coupled to the oscillator for mixing the vertically polarized signal with the first local oscillating signal; and
a bandpass filter coupled to the mixer for filtering the vertically polarized signal mixed with the first local oscillating signal to convert the vertically polarized signal into the first IF signal.

4. The optical-LNB of claim 1, wherein the second down-conversion module comprises:
an LNA coupled to the satellite antenna and comprising at least one low noise amplification unit for providing at least one level of signal amplification;
a bandpass filter coupled between the LNA and the second down-converter for filtering the horizontally polarized signal to convert the horizontally polarized signal into the second IF signal by the second down-converter; and
a gain amplifier coupled to the second down-converter for amplifying the second IF signal.

5. The optical-LNB of claim 4, wherein the second down-converter comprises:
an oscillator for generating a second local oscillating signal;
a mixer coupled to the oscillator for mixing the horizontally polarized signal with the second local oscillating signal; and
a bandpass filter coupled to the mixer for filtering the horizontally polarized signal mixed with the second local oscillating signal to convert the horizontally polarized signal into the second IF signal.

6. The optical-LNB of claim 1, wherein the third down-conversion module comprises:
a first LNA coupled to the first input terminal for receiving and amplifying the vertically polarized signal;
a second LNA coupled to the second input terminal for receiving and amplifying the horizontally polarized signal; and a third down-converter coupled to the first and second LNA to receive a composite signal generated by adding the vertically polarized signal and the horizontally polarized signal, and comprising:
an oscillator for generating a third local oscillating signal;
a mixer coupled to the oscillator for mixing the composite signal with the third local oscillating signal;
a bandpass filter coupled to the mixer for filtering the composite signal mixed with the third local oscillating signal to convert the composite signal into the legacy electrical signal; and
a gain amplifier coupled to the bandpass filter for amplifying the legacy electrical signal.

7. The optical-LNB of claim 6, wherein the third down-conversion module further comprises a plurality of power dividers coupled to the first and second input terminals for respectively draining out part of the vertically polarized signal and the horizontally polarized signal.

8. The optical-LNB of claim 6, wherein the third down-conversion module further comprises a plurality of coupling circuits coupled to the first and second input terminals for respectively draining out part of the vertically polarized signal and the horizontally polarized signal.

9. The optical-LNB of claim 1, further comprising:
a diplexer coupled to the first and second down-conversion modules for combining the first IF signal and the second IF signal to generate an electrical signal;
a gain amplifier coupled to the diplexer for amplifying the electrical signal; and
an electric-optical converter coupled to the gain amplifier for converting the electrical signal into an optical signal to output to an FC-connector to transmit the optical signal by an optical cable.

10. The optical-LNB of claim 1, further comprising a power supplier coupled to an F-connector for receiving a direct voltage applied by a demodulator of the satellite system to supply a power of the optical-LNB, and the F-connector is further coupled to the third down-conversion module for outputting the legacy electrical signal, such that the demodulator reads the legacy electrical signal to control an operation of the optical-LNB.

11. A satellite television system, comprising:
a satellite antenna for receiving a vertically polarized signal and a horizontally polarized signal;
an optical-LNB (Low-Noise Block down-converter) comprising:
a first down-conversion module coupled to the satellite antenna for converting the vertically polarized signal into a first IF (Intermediate Frequency) signal;
a second down-conversion module coupled to the satellite antenna for converting the horizontally polarized signal into a second IF signal; and
a third down-conversion module comprising a first input terminal coupled between the satellite antenna and a first down-converter of the first down-conversion module and a second input terminal coupled between the satellite antenna and a second down-converter of the second down-conversion module for draining out part of the vertically polarized signal and the horizontally polarized signal to combine and convert into a legacy electrical signal; and
a demodulator coupled to the optical-LNB for reading the legacy electrical signal to control an operation of the optical-LNB.

12. The satellite television system of claim 11, wherein the first down-conversion module comprises:

an LNA (Low Noise Amplifier) coupled to the satellite antenna, and comprising at least one low noise amplify unit for providing at least one level of signal amplification;

a bandpass filter coupled between the LNA and the first down-converter for filtering the vertically polarized signal to convert the vertically polarized signal into the first IF signal by the first down-converter; and a gain amplifier coupled to the first down-converter for amplifying the first IF signal.

13. The satellite television system of claim 12, wherein the first down-converter comprises:

an oscillator for generating a first local oscillating signal;

a mixer coupled to the oscillator for mixing the vertically polarized signal with the first local oscillating signal; and a bandpass filter coupled to the mixer for filtering the vertically polarized signal mixed with the first local oscillating signal to convert the vertically polarized signal into the first IF signal.

14. The satellite television system of claim 11, wherein the second down-conversion module comprises:

an LNA coupled to the satellite antenna and comprising at least one low noise amplification unit for providing at least one level of signal amplification;

a bandpass filter coupled between the LNA and the second down-converter for filtering the horizontally polarized signal to convert the horizontally polarized signal into the second IF signal by the second down-converter; and a gain amplifier coupled to the second down-converter for amplifying the second IF signal.

15. The satellite television system of claim 14, wherein the second down-converter comprises:

an oscillator for generating a second local oscillating signal;

a mixer coupled to the oscillator for mixing the horizontally polarized signal with the second local oscillating signal; and a bandpass filter coupled to the mixer for filtering the horizontally polarized signal mixed with the second local oscillating signal to convert the horizontally polarized signal into the second IF signal.

16. The satellite television system of claim 11, wherein the third down-conversion module comprises:

a first LNA coupled to the first input terminal for receiving and amplifying the vertically polarized signal;

a second LNA coupled to the second input terminal for receiving and amplifying the horizontally polarized signal; and a third down-converter coupled to the first and second LNA to receive a composite signal generated by adding the vertically polarized signal and the horizontally polarized signal, and comprising:

an oscillator for generating a third local oscillating signal;

a mixer coupled to the oscillator for mixing the composite signal with the third local oscillating signal;

a bandpass filter coupled to the mixer for filtering the composite signal mixed with the third local oscillating signal to convert the composite signal into the legacy electrical signal; and a gain amplifier coupled to the bandpass filter for amplifying the legacy electrical signal.

17. The satellite television system of claim 16, wherein the third down-conversion module further comprises a plurality of power dividers coupled to the first and second input terminals for respectively draining out part of the vertically polarized signal and the horizontally polarized signal.

18. The satellite television system of claim 16, wherein the third down-conversion module further comprises a plurality of coupling circuits coupled to the first and second input terminals for respectively draining out part of the vertically polarized signal and the horizontally polarized signal.

19. The satellite television system of claim 11, wherein the optical-LNB further comprising:

a diplexer coupled to the first and second down-conversion modules for combining the first IF signal and the second IF signal to generate an electrical signal;

a gain amplifier coupled to the diplexer for amplifying the electrical signal; and an electric-optical converter coupled to the gain amplifier for converting the electrical signal into an optical signal to output to a FC-connector to transmit the optical signal by an optical cable.

20. The satellite television system of claim 11, further comprising a power supplier coupled to an F-connector for receiving a direct voltage applied by a demodulator of the satellite system to supply a power of the optical-LNB, and the F-connector is further coupled to the third down-conversion module for outputting the legacy electrical signal, such that the demodulator reads the legacy electrical signal to control an operation of the optical-LNB.

* * * * *